(12) United States Patent
Hornung

(10) Patent No.: US 10,107,375 B2
(45) Date of Patent: Oct. 23, 2018

(54) DIFFERENTIAL GEAR ASSEMBLY

(71) Applicant: AUDI AG, Ingolstadt (DE)

(72) Inventor: Kurt Hornung, Leinburg (DE)

(73) Assignee: Audi AG, Ingolstadt (DE)

( * ) Notice: Subject to any disclaimer, the term of this patent is extended or adjusted under 35 U.S.C. 154(b) by 206 days.

(21) Appl. No.: 15/110,892

(22) PCT Filed: Dec. 10, 2014

(86) PCT No.: PCT/EP2014/003300
§ 371 (c)(1),
(2) Date: Jul. 11, 2016

(87) PCT Pub. No.: WO2015/106787
PCT Pub. Date: Jul. 23, 2015

(65) Prior Publication Data
US 2016/0377161 A1    Dec. 29, 2016

(30) Foreign Application Priority Data
Jan. 16, 2014    (DE) .................. 10 2014 000 430

(51) Int. Cl.
*F16H 48/40*    (2012.01)
*F16H 48/38*    (2012.01)
(Continued)

(52) U.S. Cl.
CPC ............. *F16H 48/40* (2013.01); *F16H 48/08* (2013.01); *F16H 48/10* (2013.01); *F16H 48/38* (2013.01);
(Continued)

(58) Field of Classification Search
None
See application file for complete search history.

(56) References Cited

U.S. PATENT DOCUMENTS

| 2,563,680 A | * | 8/1951 | Hoffman | ................. F16H 48/08 384/392 |
| 2,609,710 A | * | 9/1952 | Osborn | ................. B60K 17/16 29/425 |

(Continued)

FOREIGN PATENT DOCUMENTS

| DE | 38 31 003 A1 | 5/1989 |
| DE | 103 04 080 A1 | 8/2004 |

(Continued)

OTHER PUBLICATIONS

International Search Report issued by the European Patent Office in International Application PCT/EP2014/003300.

*Primary Examiner* — Colby M Hansen
(74) *Attorney, Agent, or Firm* — Henry M. Feiereisen LLC

(57) ABSTRACT

A differential gear assembly, in particular for a motor vehicle, includes a gearwheel, driven by a pinion and arranged on a differential case that is rotatably mounted in a gearbox case via rolling-contact bearings on both sides. Planet gears are supported in the differential case on at least one driving pin and meshing with axis-parallel output gears on output half-shafts. The gearwheel is attached to the differential case without form fit in circumferential direction and has recesses into which the at least one driving pin formfittingly projects in circumferential direction.

13 Claims, 3 Drawing Sheets

(51) Int. Cl.
*F16H 48/08* (2006.01)
*F16H 48/10* (2012.01)

(52) U.S. Cl.
CPC .. *F16H 2048/085* (2013.01); *F16H 2048/102* (2013.01); *F16H 2048/382* (2013.01); *F16H 2048/385* (2013.01); *F16H 2048/405* (2013.01)

(56) References Cited

U.S. PATENT DOCUMENTS

| | | | | |
|---|---|---|---|---|
| 3,901,103 | A * | 8/1975 | Hufstader | F16H 48/08 |
| | | | | 475/230 |
| 4,733,578 | A * | 3/1988 | Glaze | B60K 17/16 |
| | | | | 475/160 |
| 6,056,663 | A | 5/2000 | Fett | |
| 7,485,065 | B2 * | 2/2009 | Kearney | F16C 25/06 |
| | | | | 384/537 |
| 7,503,867 | B2 * | 3/2009 | Fahrni, Jr. | B60K 17/16 |
| | | | | 384/583 |
| 2002/0042321 | A1 | 4/2002 | Niebauer | |
| 2003/0144106 | A1 | 7/2003 | Szalony et al. | |
| 2003/0144107 | A1 | 7/2003 | Orr et al. | |
| 2004/0162178 | A1 | 8/2004 | Krzesicki et al. | |

FOREIGN PATENT DOCUMENTS

| | | |
|---|---|---|
| DE | 103 04 124 B4 | 1/2006 |
| DE | 10 2004 008 538 B4 | 9/2006 |
| EP | 1 555 460 A1 | 7/2005 |
| GB | 2 253 662 A | 9/1992 |

\* cited by examiner

DIFFERENTIAL GEAR ASSEMBLY

CROSS-REFERENCES TO RELATED APPLICATIONS

This application is the U.S. National Stage of International Application No. PCT/EP2014/003300, filed Dec. 10, 2014, which designated the United States and has been published as International Publication No. WO 2015/106787 and which claims the priority of German Patent Application, Serial No. 10 2014 000 430.9, filed Jan. 16, 2014, pursuant to 35 U.S.C. 119(a)-(d).

BACKGROUND OF THE INVENTION

The present invention relates to a differential gear assembly, in particular for a motor vehicle, according to the preamble of claim 1.

EP 1555460 A1 discloses a differential gear assembly of conventional design. In the differential gear assembly, the driving torque is transmitted from the gearwheel, driven by a pinion, to the differential case and from there via the driving pin and the planet gears to the output gears attached onto the output half-shafts. This requires a correspondingly stiff differential case, usually a cast construction. The differential case normally is provided with larger windows through which the planet gears and the output gears are being mounted. Also securement of the driven gearwheel, optionally a ring gear, is correspondingly complex and is to be configured torsionally rigid (for example, by welded or screw connections).

SUMMARY OF THE INVENTION

The object of the invention is to provide a differential gear assembly of the generic type, which is simple in structure, more lightweight, and easy to install.

The object is achieved according to the invention by a differential gear assembly, in particular for a motor vehicle, including a ring-shaped gearwheel, driven by a pinion and arranged on a differential case that is rotatably mounted in a gearbox case via rolling-contact bearings on both sides, with planet gears being supported in the differential case on at least one driving pin and meshing with axis-parallel output gears on output half-shafts, wherein the ring-shaped gearwheel is attached to the differential case without form fit in circumferential direction and has recesses into which the at least one driving pin formfittingly projects in circumferential direction. By this measure, the differential case is relieved from the driving torques and is used only for component guidance, while the driving torque is directly transmitted from the gearwheel to the at least one driving pin, etc. As a result, the differential case and the arrangement of the gearwheel on the differential case can be configured significantly simpler and more lightweight.

Advantageous refinements and configurations of the invention are set forth in the subclaims.

The gearwheel can be made simple in structure and easy to install by a locking ring to hold it axially on the outer periphery of the differential case.

Furthermore, the differential case can be manufactured in a cost-effective and lightweight manner as a thin-walled structural part of steel or light metal.

In a particularly advantageous manner, the differential case can be configured in two parts with a cup-shaped portion and a lid, with the cup-shaped portion having formed therein slots that are open toward the lid for receiving the at least one driving pin. This results in a particularly simple, optionally automated assembly of the internal components of the differential case or of the driving pin with the planet gears and the output gears. There is no need for providing larger windows in the differential case.

The structural configuration of the differential gear assembly can be further simplified by holding the cup-shaped cup portion and the lid of the differential case in axial and radial directions by the rolling-contact bearings on both sides in the absence of any fasteners. In addition, the lid can have a radially outer annular groove, into which the circumferential wall of the cup-shaped portion can project at the end face for achieving a rigid union.

In the presence of high drive power to the differential, provision can be made for a cross-shaped carrier, which can be placed into the differential case via four slots that are open toward the lid, and which supports planet gears in mesh with the output gears and engages in corresponding four recesses of the gearwheel.

The planet gears of the differential gear assembly can be configured in a conventional manner as bevel gears that mesh with conically configured output gears, or the output gears can be configured in a particularly preferred manner on the output half-shafts as crown wheels that mesh with simple spur gears as planet gears. The latter configuration has benefits in particular in terms of manufacture and requires less space in axial direction.

According to a further preferred embodiment of the invention, the gearwheel can be supported with a ring-shaped protrusion directly on one of the bilateral rolling-contact bearings in relation to the gearbox case resulting in a robust, rigid support of the gearwheel with precise gear meshing. In particular, when the gearwheel is a ring gear which cooperates with a conical driving pinion, with the ring-shaped protrusion being provided on the side opposite to the toothing of the ring gear, a smoothly running support of the ring gear can be realized with beneficial manufacturing tolerances.

Finally, a support of the differential gear assembly in the gearbox case, which support is beneficial in terms of gearbox efficiency, can be realized by configuring the rolling-contact bearings on both sides as tapered ball bearings, preferably aligned in O-arrangement.

The invention thus relates to a differential with for example press-mounted ring gear. The differential may be mounted directly via a ball bearing, such as a tapered ball bearing, in the gearbox case. In addition, the differential case can be made in two parts and optionally include the combination of bevel wheel and differential bevel or the combination of crown wheel and planet gear. An additional structural benefit resides in the direct introduction of torque to the driving pin. The differential case is thus spared from exposure to torque stress. In view of the direct torque introduction, the differential case can be designed of reduced weight due to the lower stress exposure. Advantageously, there is advantageously no longer any need for the ring gear to be welded or bolted. In addition, adjustment of the differential can be realized without adjusting shims and the ring gear can be supported directly on rolling-contact bearings. In addition, there is a slight bearing biasing force at low temperatures and thus an optimized efficiency. The torque introduction is established via a load path which extends from the ring gear via the pin to the differential gears.

BRIEF DESCRIPTION OF THE DRAWING

Two exemplary embodiments of the invention are described in greater detail. The schematic drawing shows in.

DETAILED DESCRIPTION OF PREFERRED EMBODIMENTS

Figure 1:
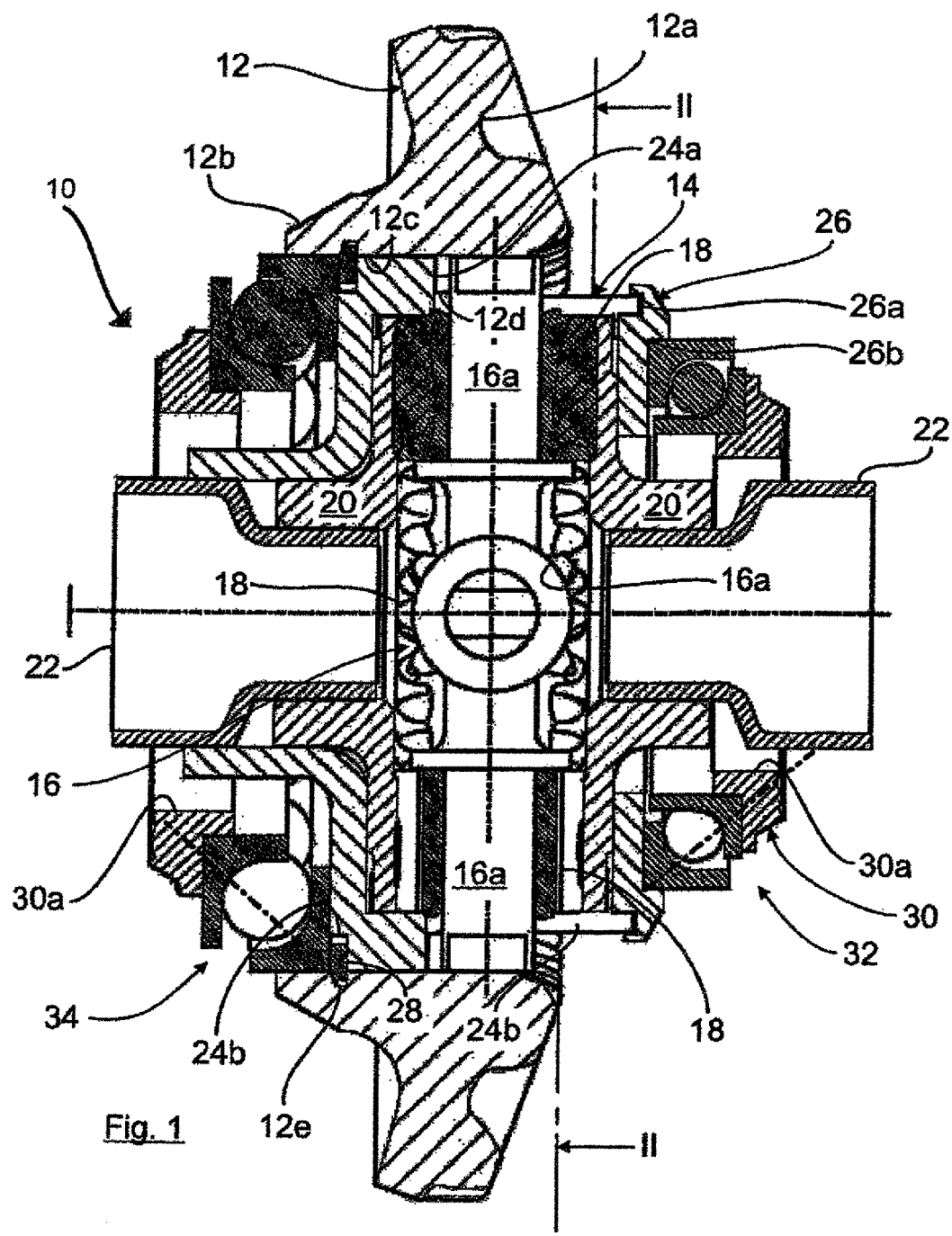
FIG. 1 a longitudinal section a differential gear assembly for a motor vehicle with a driven ring gear which is in driving relationship directly via a driving pin and planet gears to the output gearwheels of output half-shafts, and with a differential case, which is rotatably mounted via tapered ball bearings in the gearbox case.
Figure 2:
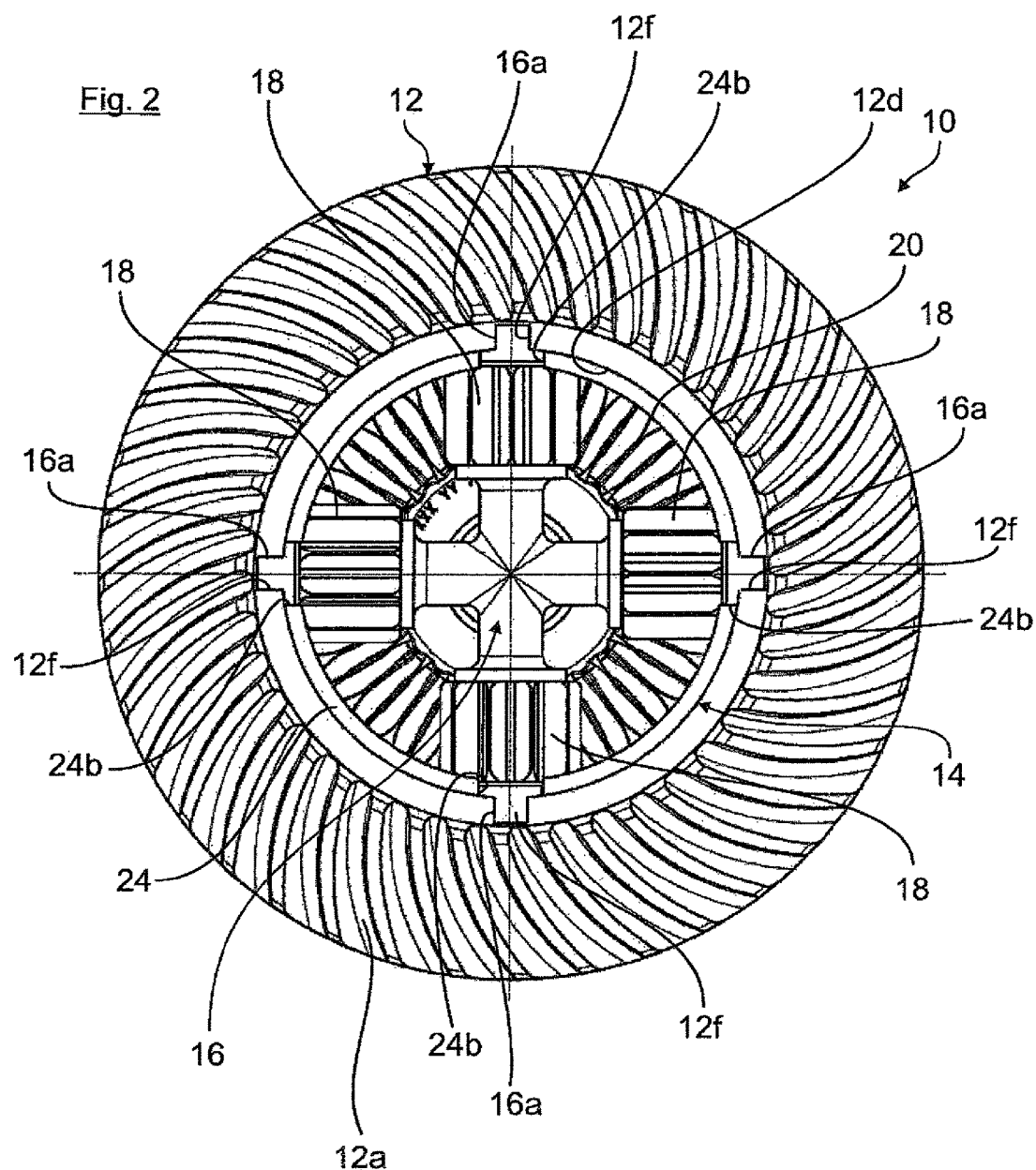
FIG. 2 a cross section taken along line II-II in FIG. 1 through the differential gear assembly.
Figure 3:
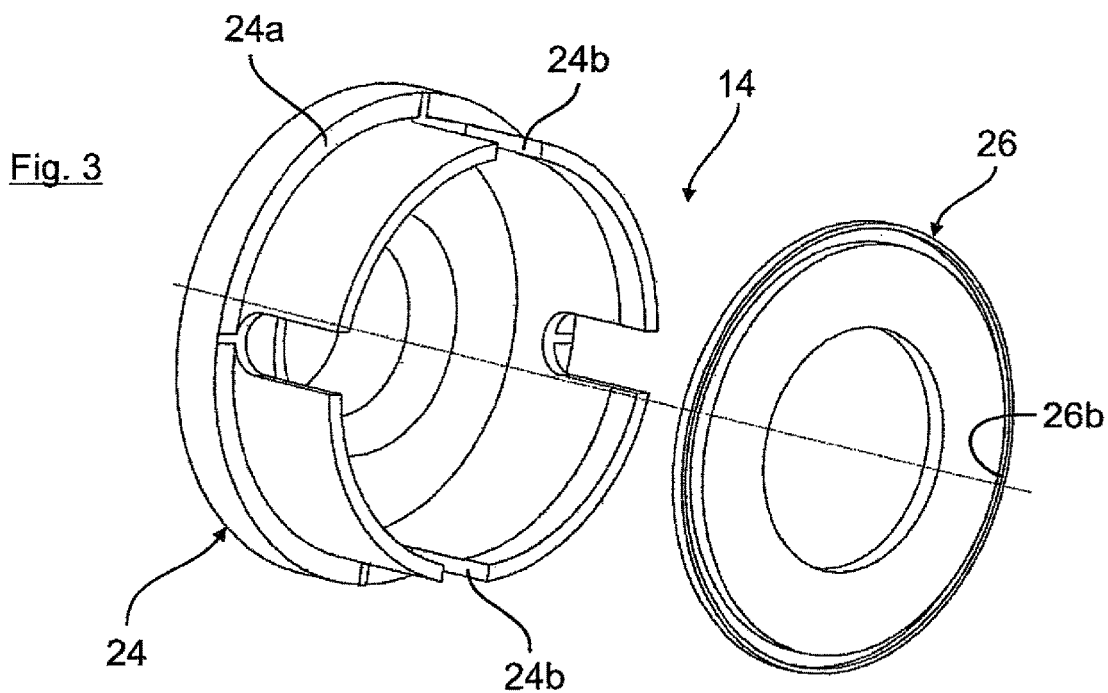
FIG. 3 a three-dimensional view of the differential case with lid of the differential gear assembly according to FIGS. 1 and 2.

FIGS. 1 to 3 illustrate a differential gear assembly 10 which is formed as an axle drive for driving wheels of a motor vehicle and which has as input element a ring-shaped gearwheel or ring gear 12 here, driven by a pinion (not visible).

The ring gear 12 is arranged on a differential case 14 and drives in a manner still to be described via a cross-shaped driving pin 16 and four planet gears 18 the central output gears 20 and the axle half-shafts 22, connected to the output gears via plug connections, as output elements of the differential gear assembly 10.

The ring-shaped ring gear 12 has, on one hand, a hypoid toothing 12a in engagement with the driving pinion, and, on the other hand, has an axial protrusion 12b to increase width and hub thereof.

Further, the inner periphery of the ring gear 12 (FIG. 1) has a stepped configuration, with a portion 12c of greater diameter and a portion 12d of smaller diameter.

The ring gear 12 is mounted on the differential case 14 without form fit in circumferential direction, for example with a sliding fit or a slight press fit.

For this purpose, the relatively thin-walled, rotationally symmetrical differential case 14 (FIG. 3) made of steel or light metal has a cup-shaped portion 24 and a disk-shaped lid 26, with the ring gear 12 surrounding the likewise stepped-shaped outer periphery of the portion 24.

The ring gear 12 is hereby axially held on the differential case 14 between the thus-formed annular shoulder 24a (FIG. 1) of the portion 24 of the differential case 14 and an open annular groove 24b of the portion 24 and a corresponding annular groove 12e on the inner circumference 12c of the ring gear 12.

Provision is made in the differential case 14 or its portion 24 (FIG. 2) for four slot-shaped recesses 24b which are open toward the lid 26 and into which the four bearing journals 16a of the cross-shaped driving pin 16 can be inserted.

FIG. 1 shows the assembled state, in which the lid 26 is attached upon the portion 24 of the differential case 14. Accordingly, the lid 26 embraces with a radially outer annular groove 26a (FIG. 1) the peripheral wall of the portion 24 at an end face. As the lid 26 has been attached, precise guidance in axial and radial directions is established for the planet gears 18 with the driving pin 16 and the output gears 20 between the two end walls of the differential case 14 and within the peripheral wall of the portion 24.

The output gears 20 are, as shown in FIG. 1, configured as crown wheels with radially oriented teeth and mesh with the four planet gears 18, which are produced as a simple spur gears.

To assemble the components, initially the one output gear 20 and then the cross-shaped driving pin 16 with planet gears 18 being attached on the bearing journals 16a thereof, and finally the output gear 20, next to the lid 26, are placed into the portion 24, and then the lid 26 attached.

The bearing journals 16a (FIGS. 1 and 2), extending in axial direction beyond the planet gears 18, engage hereby into the recesses 24b of the portion 24 of smaller diameter of the differential case 14 and extend there through, for clearance-free engagement in further corresponding four recesses 12f in the ring gear 12. The recesses 12f are hereby designed as axis-parallel grooves. For easy transfer of the driving torque from the ring gear 12 directly to the driving pin 16, the portions of the bearing journals 16a, extending beyond the differential case 14, can have key areas or can be configured flat (indicated in FIG. 2).

As a result, the ring gear 12 drives directly via the driving pin 16 the planet gears 18 and the output gears 20 and the axle half shafts 22, while the differential case 14 only forms component guidance.

The support of the differential gear assembly 10 in the gearbox case 30 (only hinted) at respective annular bearing mounts 30a (FIG. 1) is realized by two rolling-contact bearings, preferably by two tapered ball bearings 32, 34, which are installed in O-arrangement (compare drawn, dot-dash lines of action)\

The radially inner bearing rings of the ball bearings 32, 34 are hereby supported radially and axially on the bearing mounts 30a of the gearbox case.

The radially outer bearing ring of the ball bearing 32 is placed in an annular shoulder 26b of the lid 26 and forms both an axially and radially acting rotary support of the differential case 14.

The radially outer bearing ring of the ball bearing 34 of larger diameter is placed directly into the portion 12c of greater diameter of the ring gear 12 and bears in addition upon the end face of the portion 24 of the differential case 14 and upon the annular groove 24b, open toward the end face, and upon the locking ring 28. The thus established very precise and rigid rotary support ensures a smooth operation of the hypoid toothing.

Figure 4:
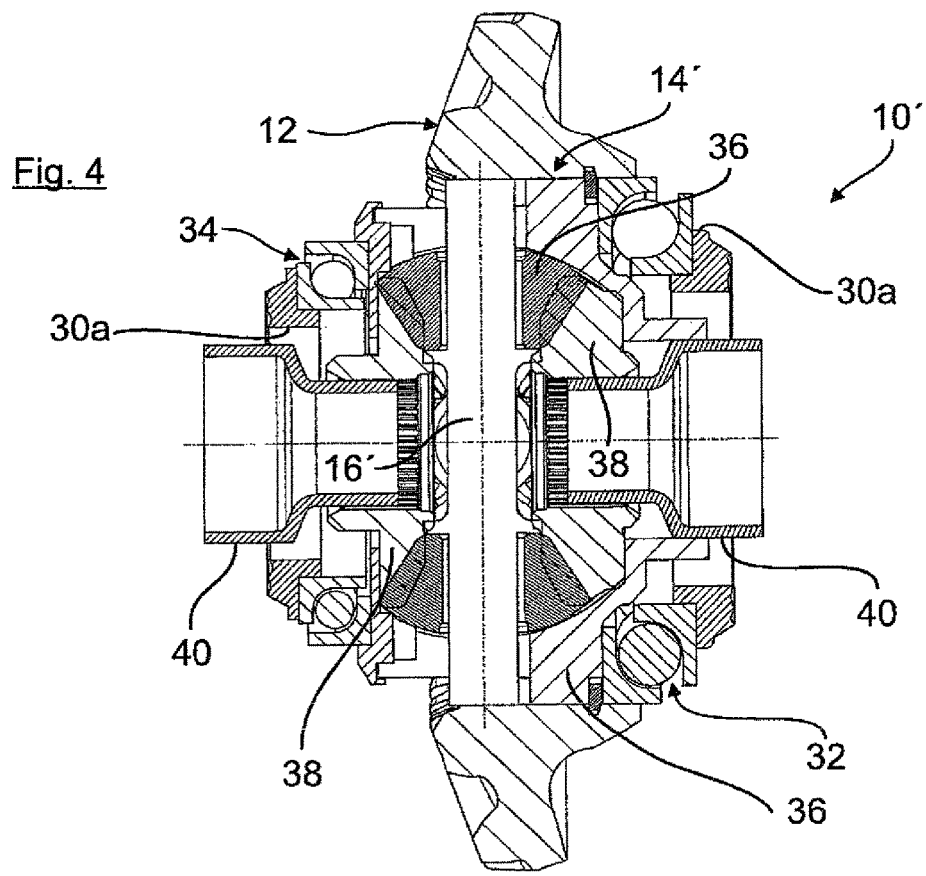
FIG. 4 as an alternative to the preceding Figures, a differential gear assembly, in which the planet gears and the output gears are configured as bevel gears.

FIG. 4 shows as an alternative to FIGS. 1 to 3 an exemplified embodiment of the differential gear 10', in which the planet gears 36 and the output gears 38 on the axle half shafts 40 are configured in a known manner as bevel gears. It is to be understood that the differential case 14' is to be modified correspondingly in terms of the internal axial and radial guidance of the gearwheels and the larger axial installation space.

In order to avoid repetition, reference is made to the features described with reference to FIGS. 1 to 3, which can be configured functionally identical in FIG. 4. Instead of a cross-shaped driving pin 16, a simple driving pin 16' may also be used with only two planet gears 18.

What is claimed is:

1. A differential gear assembly, comprising:
a differential case;
rolling-contact bearings rotatably mounting the differential case on both sides in a gearbox case;
at least one driving pin supporting planet gears in the differential case which mesh with axis-parallel output gears on output half-shafts; and
a ring-shaped gearwheel capable of being driven by a pinion and attached to the differential case without form fit in a circumferential direction, said gearwheel having recesses into which the at least one driving pin formfittingly projects in the circumferential direction.

2. The differential gear assembly of claim 1, further comprising a locking ring configured to axially secure the gearwheel on an outer periphery of the differential case.

3. The differential gear assembly of claim 1, wherein the differential case is a thin-walled structural part of steel or light metal.

4. The differential gear assembly of claim 1, wherein the differential case is formed in two parts which include a cup-shaped portion and a lid, said cup-shaped portion having formed therein slots which are open toward the lid for receiving the at least one driving pin.

5. The differential gear assembly of claim 4, wherein the cup-shaped portion and the lid of the differential case are held by the rolling-contact bearings in axial and radial directions in the absence of any fastener.

6. The differential gear assembly of claim 4, wherein the lid has a radially outer annular groove into which a peripheral wall of the cup-shaped portion projects.

7. The differential gear assembly of claim 4, wherein the at least one driving pin has a cross-shaped configuration, said at least one driving pin carrying four said planet gears in mesh with the output gears and engaging into corresponding four recesses of the gearwheel.

8. The differential gear assembly of claim 1, wherein the output gears are conical in shape, said planet gears are bevel gears meshing with the output gears.

9. The differential gear assembly of claim 1, wherein the planet gears are spur gears, said output gears on the output half-shafts being designed as crown wheels which mesh with the spur gears.

10. The differential gear assembly of claim 1, wherein the gearwheel has an annular protrusion to support the gearwheel directly on one of the rolling-contact bearings in relation to the gearbox case.

11. The differential gear assembly of claim 10, wherein the gearwheel is configured as a ring gear which cooperates with the pinion, said annular protrusion being provided on a side opposite to a toothing of the ring gear.

12. The differential gear assembly of claim 1, wherein the rolling-contact bearings are tapered ball bearings.

13. The differential gear assembly of claim 1, wherein the rolling-contact bearings are aligned in O-arrangement.

* * * * *